Patented Jan. 9, 1940

UNITED STATES PATENT OFFICE 2,186,366

HALOGEN - CONTAINING CONDENSATION PRODUCT AND METHOD OF MAKING SAME

Gerald H. Coleman, Garnett V. Moore, and George B. Stratton, Midland, Mich., assignors to The Dow Chemical Company, Midland, Mich., a corporation of Michigan No Drawing. Application February 3, 1937, Serial No. 123,898

16 Claims. (Cl. 260—649)

This invention concerns certain new halogen-containing organic condensation products and a method of making the same.

Our new products are prepared by reacting nuclear halogenated benzene hydrocarbons, containing not more than two substituents in the benzene nucleus, with an ethylene halide in the presence of a Friedel-Crafts catalyst under the reaction conditions hereinafter described. The expression "benzene hydrocarbons," as employed herein, refers to hydrocarbons of the benzene series, e. g. benzene, toluene, ethyl benzene, propyl benzene, etc. The products are obtained initially as elastic rubber-like plastic masses which contain the catalyst and usually some unreacted ethylene halide. These elastic products are substantially insoluble in the usual organic solvents such as benzene, acetone, kerosene, etc. They are useful as chemical agents from which a variety of other organic products may be prepared. For instance, they may be further alkylated by reaction with alkyl halides or olefines to obtain a variety of other products useful as plasticizers or fillers in rubber, nitrocellulose, cellulose ester, and cellulose ether compositions, etc.

When the above-mentioned elastic intermediate products are treated to remove the catalyst and organic solvents, e. g. unreacted ethylene halide and/or halogenated benzene hydrocarbon, they lose their elastic properties and remain as halogen-containing solids which are also insoluble in the usual organic solvents such as benzene, acetone, alcohols, paraffin hydrocarbons, alkyl halides, etc., and which may be crumbled by pressure or rubbing. Such non-elastic products have good dielectric properties which render them useful as electric insulating materials. When the above-mentioned condensation reaction is carried out at temperatures below 100° C. and the elastic intermediate product is treated to remove the catalyst and solvents therefrom, the non-elastic final product is obtained in the form of a porous mass having the appearance of a sponge. Such porous product may be used as a heat or electric insulating material.

The hereindescribed new condensation products are obtained only by reacting a nuclear halogenated benzene hydrocarbon, containing not more than two nuclear substituents, with one molecular equivalent or more, preferably between 1 and 5 equivalents, of an ethylene halide, such as ethylene chloride, ethylene bromide, or ethylene chlorobromide, in the presence of an active Friedel-Crafts catalyst, such as aluminum chloride, aluminum bromide, etc. The reaction frequently starts at room temperature or thereabout but is preferably completed at higher temperatures, e. g. 35°–125° C. These products are not obtained when a nuclear halogenated benzene hydrocarbon containing three or more nuclear substituents, e. g. trichlorobenzene, 2,4-dichlorotoluene, etc., is employed, or when a propylene halide or butylene halide, etc., is used, or when the reaction is carried out with substantially more than one mol of the nuclear halogenated benzene hydrocarbon per mol of ethylene halide.

Approximately 0.1 mol or more, preferably between 0.2 and 0.5 mol, of the catalyst is employed per mol of the nuclear halogenated benzene hydrocarbon reactant, although the minimum proportion of catalyst required is dependent to some extent upon the particular reactants employed. For instance, a somewhat smaller proportion of catalyst is sufficient to effect the condensation of para-chloro-toluene with ethylene chloride than to condense ortho-dichlorobenzene with ethylene chloride, but 0.2 mol of aluminum chloride per mol of the halogenated benzene is sufficient to promote either of said reactions.

The rate of reaction is influenced by the order in which the reactants are mixed. The reaction occurs most rapidly and smoothly when the ethylene halide is added gradually to a mixture of the catalyst and halogenated benzene hydrocarbon, while stirring and heating the mixture at temperatures above 35° C. It also takes place, though less smoothly, when the catalyst and the necessary reactants are first mixed at room temperature and the mixture is then heated with stirring to a corresponding reaction temperature. The reaction proceeds still less favorably when the nuclear halogenated benzene hydrocarbon is added gradually with stirring to a mixture of the catalyst and ethylene halide.

The mixture gradually thickens as the reaction progresses until a point is reached at which it becomes elastic, resembling rubber. When the reaction is carried out at temperatures up to 100° C. or thereabout swelling occurs with resultant formation of a highly porous, sponge-like, rubbery mass. The products obtained at higher reaction temperatures are also elastic but contain smaller pores. Heating of the mixture is preferably continued for some time, e. g. 5 minutes to 0.5 hour or longer, after the rubber-like material is formed so as to assure complete reaction. The entire time of heating is usually between 0.5 hour and 2 hours, although longer periods are sometimes required.

The rubber-like reaction product is washed thoroughly with water, aqueous acid, or aqueous alkali to remove the catalyst therefrom, after which traces of unreacted ethylene halide and/or the halogenated benzene hydrocarbon reactant are steam-distilled from the product. The residual product is a non-elastic mass having the characteristics hereinbefore stated.

The following examples illustrate a number of ways in which the principle of the invention has been employed, but are not to be construed as limiting the invention.

Example 1

A mixture of 112.5 grams (1 mol) of chlorobenzene, 198 grams (2 mols) of ethylene chloride, and 33.3 grams (0.25 mol) of aluminum chloride was heated under reflux with stirring at temperatures which were gradually raised from 26° C. to 99° C. in a period of 0.5 hour. During heating of the mixture, reaction was observable at 43° C. and occurred rapidly at 70° C. The product was a swollen, rubber-like mass when a temperature of 89° C. had been attained, and the evolution of hydrogen chloride had ceased when the final temperature of 99° C. was reached. The reacted mixture was successively washed with water, subjected to steam distillation, extracted with boiling benzene, again subjected to steam distillation to remove residual benzene therefrom, and dried. There was obtained 138 grams of a light-brown, brittle, pulverizable product which was highly porous and had the appearance of a sponge. The air-dried product contained approximately 25 per cent by weight of combined chlorine and was non-flammable.

Example 2

A mixture of 147 grams (1 mol) of ortho-dichlorobenzene, 198 grams (2 mols) of ethylene chloride, and 67 grams (0.5 mol) of aluminum chloride was heated under reflux with stirring at temperatures which were gradually raised from 30° C. to 83° C. in about 2 hours 50 minutes. The reacted mixture was a swollen, porous, elastic mass resembling rubber. It was successively washed with water, subjected to steam-distillation to remove unreacted ethylene chloride therefrom, and dried. There was obtained 352 grams of product in the form of a highly porous, light-brown, brittle mass resembling a sponge. When air-dried, it contained approximately 20 per cent of chlorine and was insoluble in benzene or ethylene chloride.

Example 3

A mixture of 147 grams (1 mol) of meta-dichloro-benzene, 198 grams (2 mols) of ethylene chloride, and 33.5 grams (0.25 mol of aluminum chloride was heated under reflux with stirring at temperatures which were gradually raised from 40° to 70° C. in 35 minutes, and from 70° to 80° C. in 2.3 hours, at the end of which time the mixture had formed a swollen, elastic, rubber-like mass. The reaction product was then separated and purified as in Example 1. There was obtained 143 grams of a light-brown, brittle, porous mass, which when air-dried contained approximately 26 per cent of chlorine.

Example 4

A mixture of 147 grams (1) mol of para-dichlorobenzene, 198 grams (2 mols) of ethylene chloride, and 67 grams (0.5 mol) of aluminum chloride was heated under reflux, with stirring, at temperatures which were gradually raised from 55° to 77° C. in 35 minutes, and from 77° to 82° C. in 45 minutes. At the end of said period the mixture had formed a swollen, rubber-like mass. The product was separated and purified as in Example 1, whereby there was obtained 146 grams of a light-brown, brittle, porous mass containing 33.4 per cent of chlorine.

Example 5

A mixture of 160 grams (1 mol) of bromobenzene, 198 grams (2 mols) of ethylene chloride, and 33.3 grams (0.25 mol) of aluminum chloride was heated for 22 minutes at temperatures which were gradually raised from 48° to 72° C. The resultant mixture was highly porous and elastic. The product was separated and purified as in Example 1. There were obtained 103 grams of a light-brown, porous mass, which when air-dried contained approximately 32.5 per cent of bromine.

Example 6

A mixture of 126.5 grams (1 mol) of ortho-chlorotoluene, 198 grams (2 mols) of ethylene chloride, and 33.4 grams (0.25 mol) of aluminum chloride was heated under reflux with stirring at temperatures which were gradually raised from 40° to 67° C. in a period of 1 hour. The resultant rubber-like mixture was treated as in Example 2. There was obtained 180 grams of a brownish-yellow, porous product resembling a sponge, which was non-elastic, readily pulverizable, and when air-dried contained about 23 per cent of chlorine.

Example 7

A mixture of 126.5 grams (1 mol) of para-chlorotoluene, 198 grams (2 mols) of ethylene chloride, and 33.4 grams (0.25 mol) of aluminum chloride was reacted and the product purified as in Example 6. There was obtained 176 grams of a non-elastic, porous, yellow mass resembling a sponge, which was easily pulverized. The air-dried product contained about 23.5 per cent of chlorine and was insoluble in benzene or ethylene chloride.

Similar products may be obtained by reacting other nuclear halogenated benzene hydrocarbons, containing not more than two nuclear substituents, with ethylene chloride or ethylene bromide under the reaction conditions hereinbefore described.

Other modes of applying the principle of the invention may be employed instead of those explained, change being made as regards the method and compounds herein disclosed, provided the steps or compounds stated by any of the following claims or the equivalent of such stated steps or compounds be employed.

We therefore particularly point out and distinctly claim as our invention:

1. The method which comprises reacting a nuclear halogenated benzene hydrocarbon, containing not more than 2 substituents in the benzene ring, with between about 1 and about 5 molecular equivalents of an ethylene halide in the presence of a Friedel-Crafts catalyst.

2. The method which comprises reacting a nuclear halogenated benzene hydrocarbon, containing not more than 2 substituents in the benzene ring, with from 1 to 5 molecular equivalents of an ethylene halide in the presence of an aluminum halide catalyst.

3. The method which comprises reacting a nuclear halogenated benzene hydrocarbon, containing not more than 2 substituents in the benzene ring, with from 1 to 5 molecular equivalents of ethylene chloride in the presence of aluminum chloride.

4. The method which comprises heating a mixture of a nuclear chlorinated benzene hydrocarbon, containing not more than 2 substituents in the benzene ring, and at least 0.1 molecular equivalent of aluminum chloride to a temperature between about 35° and about 125° C. and gradually adding at least 1 molecular equivalent of ethylene chloride to the heated mixture while stirring the latter.

5. The method which comprises reacting monochlorobenzene with from 1 to 5 molecular equivalents of ethylene chloride in the presence of aluminum chloride to obtain an elastic reaction product and thereafter removing the aluminum chloride to obtain a non-elastic halogen-containing product.

6. The method which comprises reacting a dichlorobenzene with from 1 to 5 molecular equivalents of ethylene chloride in the presence of aluminum chloride to obtain an elastic reaction product.

7. The method which comprises reacting ortho-dichlorobenzene with from 1 to 5 molecular equivalents of ethylene chloride in the presence of aluminum chloride to obtain an elastic reaction product and thereafter removing the aluminum chloride, whereby the product becomes non-elastic.

8. The method which comprises reacting para-dichlorobenzene with from 1 to 5 molecular equivalents of ethylene chloride in the presence of aluminum chloride to obtain an elastic reaction product and thereafter removing the aluminum chloride, whereby the product becomes non-elastic.

9. A halogen-containing product, substantially insoluble in benzene, comprising the product of the reaction of a nuclear halogenated benzene hydrocarbon, containing not more than 2 substituents in the benzene ring, with from 1 to 5 molecular equivalents of an ethylene halide in the presence of a Friedel-Crafts catalyst.

10. A porous halogen-containing product, substantially insoluble in benzene, comprising the product of the reaction of a nuclear halogenated benzene hydrocarbon, containing not more than 2 substituents in the benzene ring, with from 1 to 5 molecular equivalents of an ethylene halide in the presence of aluminum chloride at a temperature between 35° and 100° C.

11. An elastic halogen-containing product, substantially insoluble in benzene, prepared by reacting a nuclear halogenated benzene hydrocarbon, containing not more than 2 substituents in the benzene ring, with from 1 to 5 molecular equivalents of an ethylene halide in the presence of a Friedel-Crafts catalyst, said product containing the catalyst used in its preparation.

12. A non-elastic halogen-containing product, substantially insoluble in benzene, prepared by reacting a nuclear halogenated benzene hydrocarbon, containing not more than 2 substituents in the benzene ring, with from 1 to 5 molecular equivalents of an ethylene halide in the presence of an aluminum halide catalyst, and thereafter removing the aluminum halide from the reacted mixture.

13. A chlorine-containing product, substantially insoluble in benzene, comprising the product of the reaction of a nuclear chlorinated benzene, containing not more than two chlorine atoms, with from 1 to 5 molecular equivalents of ethylene chloride in the presence of aluminum chloride.

14. A chlorine-containing product, substantially insoluble in benzene, comprising the product of the reaction of monochlorobenzene with from 1 to 5 molecular equivalents of ethylene chloride in the presence of aluminum chloride.

15. A chlorine-containing product, substantially insoluble in benzene, comprising the product of the reaction of ortho-dichlorobenzene with from 1 to 5 molecular equivalents of ethylene chloride in the presence of aluminum chloride.

16. A chlorine-containing product, substantially insoluble in benzene, comprising the product of the reaction of para-dichlorobenzene with from 1 to 5 molecular equivalents of ethylene chloride in the presence of aluminum chloride.

GERALD H. COLEMAN.
GARNETT V. MOORE.
GEORGE B. STRATTON.